United States Patent [19]

Othen

[11] Patent Number: 4,643,769
[45] Date of Patent: Feb. 17, 1987

[54] CORROSION INHIBITING COATING COMPOSITION

[75] Inventor: David G. Othen, Bracknell, England

[73] Assignee: The British Petroleum Company p.l.c., London, England

[21] Appl. No.: 840,913

[22] Filed: Mar. 18, 1986

[30] Foreign Application Priority Data

Mar. 29, 1985 [GB] United Kingdom ............... 8508316

[51] Int. Cl.$^4$ ................................................ C09D 5/08
[52] U.S. Cl. .................................. 106/1.17; 106/14.21; 106/14.25; 106/14.33; 106/14.39; 106/288 B; 106/290; 428/469
[58] Field of Search ............... 106/14.05, 14.21, 14.25, 106/14.33, 14.39, 1.17, 288 B, 290; 428/469

[56] References Cited

U.S. PATENT DOCUMENTS 3,849,141 11/1974 Palm et al. ............................. 106/1

FOREIGN PATENT DOCUMENTS

| 0046057 | 2/1982 | European Pat. Off. |
| 0089810 | 9/1983 | European Pat. Off. |
| 2071070B | 9/1981 | United Kingdom |
| 2091235 | 7/1982 | United Kingdom |
| 2103218 | 2/1983 | United Kingdom |
| 2118557 | 11/1983 | United Kingdom |

Primary Examiner—Lorenzo B. Hayes
Attorney, Agent, or Firm—Morgan & Finnegan

[57] ABSTRACT

A composition suitable for the preparation of a surface protective coating composition e.g. a paint by admixture with an organic film-forming binder comprises (i) elemental zinc in particulate form and (ii) inorganic oxide particles such as silica having corrosion inhibiting cations e.g. calcium chemically bound to the surface by ion exchange. The amount of elemental zinc to inorganic oxide is preferably from 75:1 to 3:1 by weight. The binder can be organic e.g. an epoxy resin, epoxy ester, chlorinated rubber or polystyrene or may be inorganic e.g. silicates.

10 Claims, No Drawings

CORROSION INHIBITING COATING COMPOSITION

The present invention relates to a composition suitable for the preparation of a surface protective coating composition by admixture with a binder, to a coating composition so prepared for inhibiting corrosion of metal surfaces particularly ferrous metal surfaces and to articles or structures having ferrous metal surfaces coated with such a composition.

It is well known that a metal surface can be protected against corrosion by placing in electrical contact with the metal surface a second metal of lower standard electrode potential (i.e. a sacrificial metal). A common example of this form of protection is galvanised steel.

The use of sacrificial metal particles, usually finely divided particles, in paints is also known. In particular, it is known to protect steel surfaces with paint containing zinc dust. The known zinc-containing paints may contain organic or inorganic binders such as, for example, epoxy resins or ethyl silicate. Generally the zinc content of such paints is from 70 to 95 percent by weight and the paints are therefore commonly known as zinc-rich paints.

Zinc-rich paints can provide very good corrosion protection to steel surfaces. However, if left exposed to the environment, a layer of white zinc corrosion products forms relatively quickly on the surface, These corrosion deposits are unsightly and make further coating difficult. Even when the zinc-rich coatings are provided with an overcoat of another paint prior to exposure to the environment, zinc corrosion may cause intercoat adhesion problems and the white zinc corrosion products may still be deposited on the surface.

It has now been found that the problems associated with the zinc corrosion in zinc-rich coating compositions may be reduced by the inclusion in the composition of an effective amount of inorganic oxide particles having corrosion inhibiting ions chemically bound to the surface of the inorganic oxide particles by ion-exchange.

According to one aspect of the present invention a composition suitable for the preparation of a surface protective coating composition by admixture with a binder, comprises:
(i) elemental zinc in particulate form,
(ii) inorganic oxide particles having corrosion inhibiting cations chemically bound to the surface thereof by ion exchange.

The amount of elemental zinc to ion exchanged inorganic oxide is preferably from 75:1 to 3:1 by weight.

According to another aspect of the present invention a coating composition suitable for application to a metal surface to inhibit corrosion
(i) a binder,
(ii) from 50 to 90% by weight of elemental zinc in particulate form based on the weight of the coating composition, and
(iii) an effective amount of inorganic oxide particles having corrosion inhibiting ions chemically bound to the surface thereof by ion-exchange.

The amount of binder can conveniently be in the range 10 to 60% preferably 15 to 35% by weight based on the weight of the coating composition.

Inorganic oxide particles having corrosion inhibiting ions bound to the surface of the inorganic oxide particles by ion-exchange are known as corrosion inhibitors and are disclosed in UK Patent GB No. 2071070B, European Patent Application No. 46057 and European Patent Application No. 89810. British Patent Application No. 2091235 discloses a method of preparing certain corrosion inhibitors of this type. The disclosures of these publications are incorporated herein by reference.

Any of the ion-exchanged inorganic oxide particles disclosed in these patents and patent applications may be used in the present invention. However, the preferred particles are those in which the ions bound to the inorganic oxide are cations and the preferred inorganic oxide is silica.

Particularly preferred for use in the present invention is a corrosion inhibitor comprising silica particles having calcium ions chemically bound to the particles of the silica by ion-exchange. The inorganic oxide particles preferably have a particle size of less than 40 microns, more preferably less than 25 microns.

The inorganic oxide can conveniently contain up to 2.5 millimoles/g of corrosion inhibiting ions. The lower limit can be about 0.01 millimoles/g but is preferably 0.05 millimoles/g.

Typically, the total amount of the elemental zinc and ion-exchanged inorganic oxide contained in the coating composition is from 60 to 95% by weight. The volume ratio of zinc to ion-exchanged inorganic oxide may be, for example, from 1:0.05 to 1:1.2 preferably 1:0.67 to 1:1 or on a weight basis from 75:1 to 3:1.

Typically the coating composition of the invention will contain a binder for the zinc and inorganic oxide particles, particularly a film-forming polymer particularly an organic polymer or resin binder. Examples of organic binders include epoxy resins, epoxy esters, chlorinated rubber and polystyrene. Inorganic binders include silicates (both organic and inorganic).

The coating composition may be in the form of a paint by which we mean to include enamels, lacquers, varnishes, undercoats, primers, seals, fillers, stoppers and the like.

The coating composition can include a solvent.

The coating composition may also contain additives conventionally used in paints such as, for example, pigments, driers, thickeners and anti-skinning agents.

The coating compositions may be prepared and applied by conventional techniques.

The present invention includes structures comprising a ferrous metal surface provided with a coating according to the present invention.

The invention is illustrated by the following examples.

EXAMPLE 1

Preparation of Calcium Exchanged Silica

Calcium hydroxide was slowly added to a stirred slurry of silica in water (one part by weight of silica to two parts by weight of water) at room temperature, i.e. about 20° C. The pH was not allowed to rise above 10. Once the pH was stable, the calcium exchanged silica was filtered, washed and milled in water. The product was then dried on trays in an oven. X-ray fluorescence analysis of the product indicated a calcium content of 6.6% by weight (1.65 millimoles/g). The mean particle size was 7.1 microns.

Preparation of Paint

A zinc-rich paint according to the present invention having the composition given in Table 1 was prepared by mixing approximately one third of the resin with all of the other components, except the drier, for 20 hours in a ball mill and then blending in the remaining resin and drier.

For comparison a similar zinc-rich paint composition, not according to the present invention, which contained no calcium-exchanged silica was prepared. The comparative composition is also given in Table 1.

TABLE 1

Paint Compositions (% by weight)

| Component | Example 1 | Comparative Composition A |
|---|---|---|
| Air drying epoxy ester resin (Synolac 463X ex Cray Valley Products) as Binder | 11.58 | 10.98 |
| Zinc Dust | 72.10 | 75.95 |
| Calcium-exchanged silica | 2.17 | — |
| Calcium oxide as water scavenger | 0.52 | 0.50 |
| Bentone 34 | 0.74 | 0.70 |
| Methanol (Activator for Bentone 34) | 0.22 | 0.20 |
| 10% cobalt octoate (drier) (ex Manchem Ltd) | 0.33 | 0.03 |
| Xylene as solvent | 12.64 | 11.64 |
| *Pigment Volume Concentration (%) | 65.4 | 65.4 |
| Specific Gravity of the liquid paint | 2.55 | 2.72 |
| Volume Solids % in the liquid paint | 48.6 | 49.1 |

"Synolac" is a registered trade mark
*refers to all solids except the epoxy ester resin and is the volume concentration in the dry film.
Bentone 34 is a commerically available organic modified montmorillonite clay sold by NL Industries and is used as a gelling agent and rheology modifier. BENTONE is a registered trade mark.

Corrosion Test

The paint compositions were applied to standard degreased, polished mild steel plates by brush coating and allowed to dry. The dry film thickness of the paints was from 85 to 105 micrometres. The coatings were scribed through to the bare metal and the panels subjected to the ASTM B117-73 salt spray test. After 24 hours exposure to the salt spray, the panel coated with the comparative composition had white zinc corrosion deposits over its entire surface whereas the panel coated with the composition according to the present invention was free of such corrosion products. After 350 hours exposure to the salt spray, the panel coated with the comparative composition had relatively large amounts of white zinc corrosion deposits on the surface, the coating was blistered and corrosion of the metal surface was evident. The panel coated with the paint according to the present invention had, after 350 hours, only small amounts of the white zinc corrosion deposits on the surface. There was no blistering of the paint film and no evidence of corrosion of the mild steel.

These results show by use of the invention:
(i) the amount of white zinc corrosion deposits on the surface is greatly reduced, and
(ii) the corrosion of the steel is also reduced.

EXAMPLE 2

Preparation of Calcium Exchanged Silica

Calcium-exchanged silica was prepared as described in Example 1 except that the product was dried by heating the filter cake in an oven and was micronised to a mean particle size of 4.3 microns after drying. X-ray fluorescence analysis of the product indicated a calcium content of 6.1% by weight (1.55 millimoles/g).

Preparation of Paint

Five zinc-rich paint compositions according to the present invention were prepared containing different quantities of the calcium-exchanged silica corrosion inhibiting particles. The compositions of these five paints are given in Table 2 together with the compositions of two comparative compositions.

TABLE 2

Paint Compositions Parts by weight

| Component | Examples 2 | 3 | 4 | 5 | 6 | Comparative Compositions B | C |
|---|---|---|---|---|---|---|---|
| PART A | | | | | | | |
| Epoxy resin (Epicote 1001 × 75 ex SHELL) | 6.16 | 6.37 | 6.83 | 7.35 | 8.23 | 5.79 | 6.03 |
| Beetle BE 640 (ex BP Chemicals Limited) | 0.41 | 0.42 | 0.45 | 0.49 | 0.7 | 0.38 | 0.40 |
| Thixomen (ex ICI) | 0.34 | 0.35 | 0.37 | 0.40 | — | 0.32 | 0.33 |
| Zinc Dust | 77.60 | 75.74 | 71.61 | 66.84 | 61.26 | 81.00 | 75.95 |
| Calcium-exchanged silica | 2.16 | 3.36 | 5.99 | 9.05 | 12.58 | — | — |
| Zinc Phosphate | — | — | — | — | — | — | 4.26 |
| Xylene/n-Butanol (1:1 volume ratio) | 10.08 | 10.41 | 11.16 | 12.01 | 12.78 | 9.46 | 9.86 |
| PART B | | | | | | | |
| Versamid 115 curing agent for the epoxy resin (ex Cray Valley Products Ltd) | 2.11 | 1.18 | 2.33 | 2.51 | 2.89 | 1.98 | 2.06 |
| Xylene/n-butanol (1:1 volume ratio as solvent) | 1.14 | 1.17 | 1.26 | 1.35 | 1.56 | 1.07 | 1.11 |
| Pigment Volume Concentration % | 65 | 65 | 65 | 65 | 65 | 65 | 65 |
| Specific Gravity of liquid paint | 2.92 3.11 | 2.83 | 2.64 | 2.45 | 2.26 | 3.11 | 2.99 |
| Vol % replacement of zinc dust | 10 | 15 | 25 | 35 | 45 | 0 | 10 |

THIXOMEN, EPIKOTE, BENTONE, VERSAMID AND BEETLE are registered trade marks.

Composition B is a typical zinc-rich epoxy coating composition of the type usually employed on new steel structures.

Composition C is an experimental composition to determine whether the addition of zinc phosphate corrosion inhibitor to B improves performance.

Thixomen is a hydrogenated castor oil which acts as a thixotrope. Versamid 115 is a polyamide resin. Beetle BE640 is an n-butylated urea resin and is used as a flow control agent.

Part A of each composition was prepared by blending the resins, solvent and thixotrope, heating to a temperature of about 35° C. for approximately 10 minutes and then dispersing the pigments in the gelled mixture using a high speed disperser.

Corrosion Test

Parts A and B were mixed together and then applied to standard degreased, polished mild steel panels. The paints were applied by spin coating except for Comparative Composition C which was applied with a brush. The coatings were scratched through to the bare metal and the panels subjected to the ASTM B117-73 salt spray test for 500 hours. The amount of white zinc corrosion deposits on the surface of the panels and the amount of underfilm corrosion of the steel was assessed according to ASTM D 610-68 and the degree of blistering of the coatings was assessed according to ASTM D 714-56. The evaluation tests ASTM D 610-68 and ASTM D 714-56 are visual tests in which values are assigned on a scale of 0 to 10 where 10 is a good result i.e. no corrosion or no blisters and 0 is a bad result i.e. 100 percent of the surface corroded or very large blisters.

The results are given in Table 3 and show that the paints according to the present invention protected the mild steel panels better than either of the two comparative compositions. The amount of zinc corrosion deposits was reduced as compared with the comparative compositions and the paints according to the invention were less prone to blistering. Somewhat surprisingly the best results were obtained with a paint in which 45% by volume of the zinc powder was replaced with the calcium exchanged silica corrosion inhibiting particles (Example 6).

TABLE 3

Results of Accelerated Weathering Tests (ASTM B117 - 73)

| | Coating Composition | | | |
|---|---|---|---|---|
| | Average Dry Film Thickness (um) | Surface Blistering | Surface Corrosion Deposits | Underfilm Corrosion of steel |
| Examples | | | | |
| 2 | 84 | 10 | 6 | 10 |
| 3 | 118 | 10 | 4 | 10 |
| 4 | 122 | 10 | 7 | 10 |
| 5 | 140 | 10 | 8 | 10 |
| 6 | 84 | 10 | 10 | 10 |
| Comparative Composition | | | | |
| B | 130 | 2 | 0 | 2 |
| C | 146 | 6 | 0 | 5 |

The above results are on an exponential scale.

EXAMPLE 7 AND COMPARISON EXAMPLES 8 AND 9

For comparison purposes zinc-rich paints based upon an epoxy resin (similar formulation to that in Example 2) incorporating Barium Metaborate at two levels of substitution (10 percent and 20 percent by volume) were prepared and tested against a zinc-rich paint in which 45 percent of the zinc by volume was replaced by a calcium/silica similar to that in Example 2. Formulations are given in Table 6, and results of 800 hours ASTM salt spray test in Table 4. The results show poor performance from Barium Metaborate (recommended for this application by the manufacturers) and a much better performance from calcium/silica at a higher level of substitution.

COMPARISON EXAMPLE 10 AND EXAMPLES 11 AND 12

Zinc-rich paints based upon a chlorinated rubber binder were prepared incorporating calcium/silica (similar to the pigment in Example 2) at two levels of substitution of the zinc (20 percent and 30 percent by volume) and tested against a zinc-rich paint without additives. Formulations are given in Table 7, and results of 350 hours ASTM salt spray testing in Table 5. The results show a marked improvement in performance with increasing calcium/silica content, although the performance remains inferior to epoxy-based paints, due to the superior properties of the epoxy binder.

TABLE 4

RESULTS OF ACCELERATED WEATHERING TEST (ASTM B117-73 SALT SPRAY, 800 HOURS) ON FURTHER ZINC RICH EPOXY PRIMERS

| Example or Comparison Example | Replacement of Zinc v/v | Average Dry Film Thickness (um) | Surface Results | | Underfilm Substrate Corrosion[b] |
|---|---|---|---|---|---|
| | | | Blistering[a] | Staining[b] (white rust) | |
| 7 | 45% Ca/SiO$_2$ | 107 | 10 | 7 | 9 |
| 8 | 10% Busan | 82 | 6D | 2 | 2 |
| 9 | 20% Busan | 103 | 4D | 4 | 6 |

[a]Assessment according to ASTM D714-56, where 10 = good (no blisters), 0 = bad (very large blisters). Letters designate frequency F = few, MD = medium-dense, D = dense.
[b]Assessment according to ASTM D610-68, where 10 = good (no corrosion), 0 = bad (100% corroded).

TABLE 5

RESULTS OF ACCELERATED WEATHERING TEST (ASTM B117-73 SALT SPRAY, 350 HOURS) ON ZINC-RICH CHLORINATED RUBBER PRIMERS INCORPORATING CALCIUM/SILICA

| Example or Comparison Example | Replacement of Zinc v/v | Average Dry Film Thickness (um) | Surface Results | | Underfilm Substrate Corrosion[b] |
|---|---|---|---|---|---|
| | | | Blistering[a] | Staining[b] (white rust) | |
| 10 | 0 | 52 | 4D | 0 | 1 |
| 11 | 19% Ca/SiO$_2$ | 58 | 6D | 10 | 4 |
| 12 | 28% Ca/SiO$_2$ | 65 | 8D | 10 | 6 |

[a]Assessment according to ASTM D714-56, where 10 = good (no blisters), 0 = bad (very large blisters). Letters designate frequency F = few, MD = medium-dense, D = dense.
[b]Assessment according to ASTM D610-68, where 10 = good (no corrosion), 0 = bad (100% corroded).

TABLE 6

EXAMPLE 7 - FURTHER EPOXY FORMULATIONS PARTS BY WEIGHT

| | Example 8 | Example 9 | Example 7 |
|---|---|---|---|
| PART A | | | |
| Epicote 1001 × 75 | 6.30 | 6.59 | 8.34 |
| Beetle BE 640 | 0.54 | 0.56 | 0.72 |
| EFKA-63 | — | — | 0.45 |
| Zinc Dust | 75.80 | 70.48 | 59.78 |
| Busan 11-M1 | 3.99 | 8.35 | — |

TABLE 6-continued

EXAMPLE 7 - FURTHER EPOXY FORMULATIONS PARTS BY WEIGHT

|  | Example 8 | Example 9 | Example 7 |
|---|---|---|---|
| Calcium/Silica | — | — | 13.00 |
| Bentone SD-2 | 0.20 | 0.21 | 0.43 |
| Xylene/Butanol 1:1 | 9.77 | 10.25 | 12.77 |
| PART B |  |  |  |
| Versamid 115 | 2.21 | 2.31 | 2.93 |
| Xylene/Butanol 1:1 | 1.19 | 1.25 | 1.58 |
|  | 100 | 100 | 100 |
| PVC % | 65 | 65 | 64 |
| Paint Density | 2.96 | 2.82 | 2.23 |
| Volume Solids % | 55 | 55 | 54.6 |
| Vol % replacement of Zinc Dust | 10 | 20 | 45 |

Busan 11-M1 is a Barium Metaborate pigment produced by Buckman Laboratories Inc.

EFKA-63 is a wetting and suspending agent supplied by Croxton and Garry.

Paints 8 and 9 were prepared similarly to those in Example 2; for paint 7, part A was prepared by ball-milling all components together excepting the zinc dust, which was subsequently added by High Speed Disperser.

In all cases Parts A and B were mixed together immediately prior to application.

TABLE 7

EXAMPLES 10 TO 12 - CHLORINATED RUBBER FORMULATIONS PARTS BY WEIGHT

|  | 10 | 11 | 12 |
|---|---|---|---|
| Alloprene R10 | 4.09 | 5.57 | 6.29 |
| Cereclor 70 | 2.70 | 3.67 | 4.15 |
| Cereclor 42 | 1.39 | 1.89 | 2.14 |
| Rheoplas 39 | 0.19 | 0.26 | 0.29 |
| Zinc Dust | 74.51 | 70.26 | 63.64 |
| Calcium/Silica | — | 4.67 | 7.27 |
| Xylene | 8.56 | 6.84 | 8.11 |
| BP 180 | 8.56 | 6.84 | 8.11 |
|  | 100 | 100 | 100 |
| PVC % | 65.3 | 61.6 | 59.4 |
| Paint Density | 2.79 | 2.81 | 2.51 |
| Volume Solids % | 45.1 | 55.8 | 53.2 |
| Vol % replacement of Zinc Dust | 0 | 19 | 28 |

In all cases all ingredients except the pigments were dissolved in the solvents prior to incorporation of the pigments. In paint 10 the zinc dust was incorporated on a high speed disperser; in paints 11 and 12 the pigments were incorporated in a ball mill.

Alloprene R10 is a chlorinated rubber resin supplied by ICI.

Cereclor 70 is a chlorinated paraffin resin supplied by ICI, included as an inert extender.

Cereclor 42 is a chlorinated paraffin supplied by ICI, included as a plasticiser.

Rheoplas 39 is a stabiliser (epoxidised soya bean oil) supplied by Ciba-Geigy.

I claim:

1. A composition suitable for the preparation of a surface protective coating composition by admixture with a binder, said composition comprising
   (i) elemental zinc in particulate form,
   (ii) inorganic oxide particles having corrosion inhibiting cations chemically bound to the surface thereof by ion exchange.

2. A composition as claimed in claim 1 wherein the amount of elemental zinc to ion exchanged inorganic oxide is from 75:1 to 3:1 by weight.

3. A composition as claimed in claim 1 wherein the inorganic oxide is silica and the corrosion inhibiting ions are calcium cations.

4. A coating composition suitable for application to a metal surface to inhibit corrosion which composition comprises:
   (i) a binder,
   (ii) from 50 to 90% by weight of elemental zinc in particulate form based on the weight of the coating composition, and
   (iii) an effective amount of inorganic oxide particles having corrosion inhibiting ions chemically bound to the surface thereof by ion exchange.

5. A coating composition as claimed in claim 4 wherein the ratio of elemental zinc to ion exchanged inorganic oxide is from 75:1 to 3:1 by weight.

6. A coating composition as claimed in claim 4 wherein the inorganic oxide is silica and the corrosion inhibiting ions are calcium cations.

7. A coating composition as claimed in claim 4 wherein the amount of corrosion inhibiting ions bound to the surface of the inorganic oxide is from 0.01 to 2.5 millimoles of corrosion inhibiting ion per gram of inorganic oxide.

8. A coating composition as claimed in claim 4, in the form of a two-part package, including a curable resin binder and a curing agent for the curable resin, the curable resin and curing agent being in different parts of the pack.

9. A paint suitable for the application to a metal surface to inhibit corrosion said paint comprising (i) a binder, (ii) from 50 to 90% by weight of elemental zinc in particulate form, and (iii) as corrosion inhibitor an effective amount of silica particles having calcium cations chemically bound to the surface thereof by ion exchange.

10. Ferrous metal structures coated with a composition as claimed in claim 4.

* * * * *